US012737986B2

(12) United States Patent
Gao et al.

(10) Patent No.: US 12,737,986 B2
(45) Date of Patent: Sep. 15, 2026

(54) MESH RETOPOLOGY FOR IMPROVED ANIMATION OF THREE-DIMENSIONAL AVATAR HEADS

(71) Applicant: Roblox Corporation, San Mateo, CA (US)

(72) Inventors: Alexander Wang Gao, Ann Arbor, MI (US); Maurice Kyojin Chu, Redwood City, CA (US); Hsueh-Ti Liu, Burnaby (CA)

(73) Assignee: Roblox Corporation, San Mateo, CA (US)

( * ) Notice: Subject to any disclaimer, the term of this patent is extended or adjusted under 35 U.S.C. 154(b) by 198 days.

(21) Appl. No.: 18/609,807

(22) Filed: Mar. 19, 2024

(65) Prior Publication Data

US 2025/0299445 A1 Sep. 25, 2025

(51) Int. Cl.
*G06T 17/20* (2006.01)
*G06T 15/04* (2011.01)

(52) U.S. Cl.
CPC ............ *G06T 17/205* (2013.01); *G06T 15/04* (2013.01)

(58) Field of Classification Search
CPC ....... G06T 17/205; G06T 15/04; G06T 13/40; G06T 17/20
See application file for complete search history.

(56) References Cited

U.S. PATENT DOCUMENTS

| | | | | |
|---|---|---|---|---|
| 9,824,493 B1 * | 11/2017 | Chen | G06T 17/205 |
| 2019/0222943 A1 * | 7/2019 | Andersen | G10L 21/0364 |
| 2021/0150197 A1 * | 5/2021 | Kokkinos | G06T 11/10 |
| 2023/0154111 A1 * | 5/2023 | Khakhulin | G06N 3/0464 345/420 |

FOREIGN PATENT DOCUMENTS

| | | | | |
|---|---|---|---|---|
| CN | 112257202 A * | 1/2021 | G06F 18/214 |
| CN | 114049417 A * | 2/2022 | G06N 3/045 |
| CN | 114549790 A * | 5/2022 | G06T 17/20 |
| KR | 20140126803 A * | 11/2014 | G06T 17/205 |
| WO | WO-2021099003 A1 * | 5/2021 | G06T 7/50 |
| WO | WO-2021253788 A1 * | 12/2021 | G06N 3/045 |

OTHER PUBLICATIONS

Bommes, et al., "Mixed-Integer Quadrangulation", ACM Transactions on Graphics, vol. 28, No. 3, 2009, 10 pages.

(Continued)

*Primary Examiner* — Said Broome
*Assistant Examiner* — Denis Vasiliy Minko
(74) *Attorney, Agent, or Firm* — IP Spring

(57) ABSTRACT

Some implementations relate to methods, systems, and computer-readable media for providing mesh retopology for improved animation of three-dimensional avatar heads. The system receives a three-dimensional mesh that is a representation of an avatar head; defines local coordinate frames relative to geometric features of the mesh; utilizes a machine learning model to predict frame fields based on these features; blends the predicted frame fields to calculate unified directional constraints for each mesh face element; and applies quad meshing techniques to extract a quad mesh representation of the avatar head.

20 Claims, 7 Drawing Sheets

(56) References Cited

OTHER PUBLICATIONS

Bommes, et al., "QEx: Robust Quad Mesh Extraction", ACM Transactions on Graphics, 2013, 12 pages.
De Goes, et al., "Mesh Wrap based on Affine-Invariant Coordinates", ACM SIGGRAPH Talks, 2016, 2 pages.
De Goes, et al., "Vector field processing on triangle meshes", ACM SIGGRAPH 2016 Courses, 2016, 48 pages.
Dielen, et al., "Learning Direction Fields for Quad Mesh Generation", Eurographics Symp. on Geometry Processing, vol. 40, No. 5, 2021, 11 pages.
Flick, "Triplanar Mapping: Texturing Arbitrary Surfaces", Retrieved from Internet: https://catlikecoding.com/unity/tutorials/advanced-rendering/triplanar-mapping/, Apr. 29, 2018, 65 pages.
Jakob, et al., "Instant Field-Aligned Meshes", ACM Transactions on Graphics, (Proc. SIGGRAPH Asia), 2015, 15 pages.
Kaspar, et al., "Practices by professional artists on retopology for facial animation", Retrieved from Internet: https://studio.blender.org/blog/live-retopology-at-bcon22/, Nov. 18, 2022, 10 pages.
Levy, et al., "Least Squares Conformal Maps for Automatic Texture Atlas Generation", Seminal Graphics Papers: Pushing the Boundaries, vol. 2, 2002, 10 pages.
Lim, et al., "A simple approach to intrinsic correspondence learning on unstructured 3d meshes", Proceedings of the European Conference on Computer Vision (ECCV), 2018, 14 pages.
Loper, et al., "SMPL: a skinned multi-person linear model", Seminal Graphics Papers: Pushing the Boundaries, vol. 2, 2023, pp. 851-866.
Panozzo, et al., "Frame Fields: Anisotropic and Non-orthogonal Cross Fields", ACM Transactions on Graphics, 2014, 2 pages.
Qi, et al., "PointNet: Deep Learning on Point Sets for 3D Classification and Segmentation", Proceedings of the IEEE conference on computer vision and pattern recognition, 2016, 9 pages.
Sharp, et al., "DiffusionNet: Discretization Agnostic Learning on Surfaces", ACM Transactions on Graphics, 2022, 16 pages.
Sorkine, et al., "As-Rigid-As-Possible Surface Modeling", Eurographics Symp. on Geometry Processing, 2007, 8 pages.

* cited by examiner

MESH RETOPOLOGY FOR IMPROVED ANIMATION OF THREE-DIMENSIONAL AVATAR HEADS

TECHNICAL FIELD

Implementations relate generally to the field of computer graphics and animation. More specifically, implementations relate to methods and systems for providing mesh retopology for improved animation of three-dimensional avatar heads.

BACKGROUND

In the realm of computer graphics and animation, the creation and manipulation of three-dimensional (hereinafter "3D") models, particularly those representing humanoid characters like avatar heads, are essential for various applications ranging from video games to virtual reality environments. One critical aspect of such models is their mesh topology, which refers to the arrangement of vertices, edges, and faces defining the surface geometry. For 3D avatars to be able to express and communicate effectively and emotively within virtual environments, it is important that 3D avatar heads can be animated with high quality facial expressions in real-time. This means designing the mesh topology of the 3D heads with a minimal number of vertices and faces, as well as ensuring that edges of the mesh lie along facial creases for high quality facial expression deformations.

Creating such a compact topology for avatar heads is a labor intensive task. Professional industries require a significant number of artists working full-time to meticulously create 3D assets. Years of professional training is also required to learn how to create a compact topology that is aligned with the human muscular system and drives different facial expressions in a convincing, realistic way.

Recent approaches have lowered the effort for retopology by introducing techniques for controlling the topology. For instance, one such approach attempts to create an "as-smooth-as-possible" topology given a few user-specified directional preferences. Such approaches reduce the labor effort by requiring one to specify only a sparse set of directions, instead of creating every single mesh element by hand. However, the topologies generated by these approaches still pose significant challenges, because a smooth topology is often not aligned with the muscular system for creating expressions.

For example, such approaches depend upon a particular choice of XY coordinates e.g., directions) being selected to obtain the intended result. This means that if a user provides a mesh inside a dataset that aligns with that particular choice of XY coordinates, the user will obtain the result of a smooth topology as intended. However, in practice, most users do not provide a mesh inside a training dataset; instead, they are artists that have created a shape, and they are unable to provide XY coordinates that are aligned with a training dataset. Therefore, this method requires a rigid set of directions to be provided based on a training dataset, which prevents the intended solution from being obtainable for any arbitrary model that an artist has created. Thus, retopology with these semi-automatic tools still requires a large amount of human effort to specify many constraints to guide the topology generation.

Thus, there is a need in the field of computer graphics and animation for methods and systems for providing low-complexity quad mesh representations of avatar heads that are optimized for high quality facial expressions. This indicates a need for providing a mesh retopology of 3D avatar heads with a minimal number of vertices and faces, as well as ensuring that edges of the mesh lie along creases for high quality facial expression deformations. Addressing these challenges would improve the field of character animation and simulation in virtual environments, and ensure a more immersive and flexible experience for users of such virtual environments.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations relate to methods, systems, and computer-readable media for providing mesh retopology for improved animation of three-dimensional avatar heads. Local coordinate frames are defined relative to geometric features of a three-dimensional mesh that is a representation of an avatar head. A machine learning model is used to predict frame fields based on these features, and the predicted frame fields are blended to calculate unified directional constraints for each mesh face element. Quad meshing technique(s) are applied to extract a quad mesh representation of the avatar head.

For example, in some implementations, a computer-implemented method includes receiving a three-dimensional (3D) mesh that is a representation of an avatar head, wherein the 3D mesh includes a plurality of mesh face elements; defining a plurality of local coordinate frames to be relative to geometric features of the 3D mesh; utilizing a machine learning (ML) model to: process the 3D mesh and the defined local coordinate frames as inputs, and output a prediction of a plurality of frame fields, each of the frame fields comprising a plurality of directional vectors; blending the predicted frame fields using normalized blending weights to calculate unified directional constraints for each mesh face element; and applying one or more quad meshing techniques to the blended predicted frame fields to extract a quad mesh representation of the avatar head.

Various implementations and examples of the method are described. For example, in some implementations, the 3D mesh is a triangular mesh. In some implementations, the ML model comprises a feature extraction block that uses the 3D mesh as input. In some implementations, the feature extraction block comprises a learned diffusion layer. In some implementations, the ML model comprises a feedforward network that uses the defined local coordinate frames as inputs. In some implementations, the method further includes transforming the unified directional constraints into a coordinate system that applies uniformly across the entire 3D mesh. In some implementations, applying the one or more quad meshing techniques comprises using a quadrilateral mesh extraction algorithm to generate, based on the unified directional constraints, a quad mesh with reduced complexity. In some implementations, applying the one or more quad meshing techniques comprises: applying an anisotropic variation of Mixed-Integer Quadrangulation to compute a parameterization of the 3D mesh; and using the parameterization of the 3D mesh to extract the quad mesh representation of the avatar head. In some implementations, the method further includes transferring texture from the original 3D mesh representation to the quad mesh representation of the avatar head to generate a retopologized 3D avatar head for use in animation. In some implementations, the ML model is trained on a dataset of avatar heads with manually-created topologies.

Some implementations may include a system that includes a processor and a memory coupled to the processor. The memory may have instructions stored thereon that, when executed by the processor, cause the processor to perform operations that include one or more of the features of the methods described above. Various implementations and examples of the system and/or methods are described. For example, in some implementations, defining the local coordinate frames is based on the cardinal X axis, Y axis, and Z axis of a reference space. In some implementations, defining the local coordinate frames is based on alignment with a planar reference, thereby standardizing the direction predictions across different meshes. In some implementations, the predicted frame fields include vectors for orthogonal directions relative to each local coordinate frame. In some implementations, the ML model uses the unified directional constraints as learned output to guide the extraction of the quad mesh representation. In some implementations, the learned output corresponds to a frame field estimation procedure based on directional constraints. In some implementations, the blending comprises triplanar mapping to address singularities in local basis vector fields. In some implementations, the blending is based on a linear combination of the predicted vectors, and the blending uses blending coefficients that are determined based on a face normal direction for the 3D mesh. In some implementations, the extracted quad mesh representation of the avatar head is employed within an avatar creation process to create an avatar within a virtual environment.

Some implementations include a non-transitory computer-readable medium with instructions stored thereon that, when executed by a processor, cause the processor to perform operations that can be the same or similar to features of the methods and/or systems described above.

DETAILED DESCRIPTION

Figure 1:
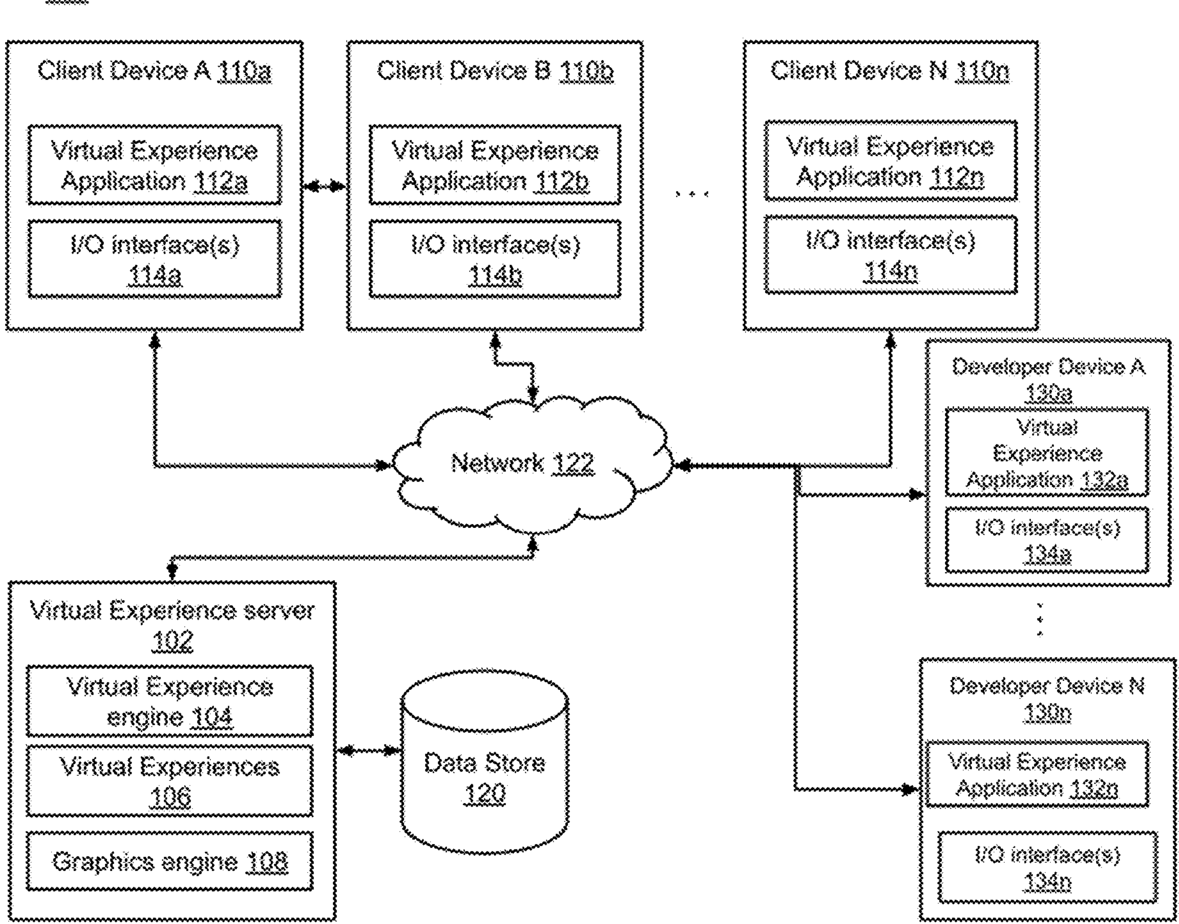
FIG. 1 is a diagram of an example system architecture for providing mesh retopology for improved animation of three-dimensional avatar heads, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

One or more implementations described herein relate to providing mesh retopology for improved animation of three-dimensional avatar heads. In some implementations, the system leverages machine learning (hereinafter "ML") techniques to predict optimal quad mesh layouts based on input triangular meshes, thereby enhancing the realism and expressiveness of avatar animations. Optimal quad mesh layouts refer to configurations that strike a balance between various factors such as, for example, geometric fidelity, computational efficiency, and animation quality. For example, optimal quad meshes may exhibit low complexity, reducing the computational resources required for rendering and animation while maintaining high-quality visual representation. Additionally, these quad meshes may accurately capture intricate facial musculature, creases, and geometric details, enhancing the realism of avatar expressions and movements. In one or more implementations, the system receives a 3D mesh representation of an avatar head; defines local coordinate frames relative to geometric features of the mesh; utilizes a ML model to predict frame fields based on these features; blends the predicted frame fields to calculate unified directional constraints for each mesh face element; and applies quad meshing techniques to extract a quad mesh representation of the avatar head.

In some implementations, the system further transforms the unified directional constraints into a coordinate system that applies uniformly across the entire 3D mesh, ensuring consistency and coherence in the resulting quad mesh representation. Additionally, some implementations involve the system employing variations in the quad meshing techniques, such as, for example, using different algorithms or parameterizations to optimize the extraction process for specific applications or performance requirements. Furthermore, in some implementations, the system may apply different approaches to feature extraction within the ML model. Such approaches may include, for example, convolutional neural networks, graph neural networks, autoencoder architectures, or attention mechanisms.

Technical advantages of one or more described features can include significant advancements in mesh retopology for animated 3D avatar heads, particularly in the context of improving animation quality and efficiency. By utilizing ML models and unified directional constraints, one or more described techniques overcome limitations observed in prior methods, such as dependency on specific local coordinate frames and the inability to generalize well across different mesh geometries. Furthermore, described techniques offer enhanced flexibility and adaptability by transforming unified directional constraints into a coordinate system that uniformly applies across an entire 3D mesh, ensuring consistency and coherence in the resulting quad mesh representation.

Further technical advantages may include accurate processing of 3D mesh data, allowing for precise predictions of directional vectors essential for quad mesh extraction. This approach enhances the robustness and accuracy of the method, leading to improved animation results with smoother transitions and more natural movements. Moreover, the incorporation of normalized blending weights in blending the predicted frame fields facilitates seamless integration of directional constraints across different mesh face elements, ensuring uniformity and coherence in the resultant quad mesh representation. Another technical advantage lies in the application of an anisotropic variation of Mixed-Integer Quadrangulation, which computes a parameterization of the 3D mesh to facilitate the extraction of quad mesh representations. This technique enhances the efficiency and effectiveness of the quad meshing process, resulting in optimized mesh structures with reduced complexity compared to the original 3D mesh. Furthermore, the ability to transfer texture from the original 3D mesh representation to the quad mesh representation adds a layer of realism and detail to the retopologized avatar heads, enhancing their visual fidelity and overall quality in animation applications.

Additional technical advantages relate to improved computational efficiency and resource utilization, leading to reduced compute time and increased efficiency in processing 3D mesh data. By employing ML models and optimized quad meshing techniques, the method streamlines the retopologization process, thereby minimizing the computational resources required for generating quad mesh representations of avatar heads. This reduction in compute time not only enhances productivity but also lowers the overall computational burden, making the method well-suited for real-time applications and scenarios where resource efficiency is paramount. Furthermore, the improved efficiency enables smoother workflow integration and faster iteration cycles, empowering content creators and developers to achieve high-quality animation results more rapidly and cost-effectively.

Additional technical advantages relate to techniques for producing low-complexity mesh representations that allow efficient and smooth animation without the need for excessive computational resources. By optimizing the quad mesh extraction process based on unified directional constraints and utilizing compact representations, the system can generate lightweight models suitable for real-time applications, such as interactive virtual environments or augmented reality experiences. These techniques reduce the computational burden on devices with limited processing capabilities, expanding the accessibility of high-quality avatar animation to a broader range of platforms and devices. Moreover, the ability to achieve smooth animation with minimal computational overhead enhances scalability and versatility, making the system suitable for various applications ranging from mobile gaming to virtual communication platforms.

FIG. 1 is a diagram of an example system architecture that can be used to provide mesh retopology for improved animation of three-dimensional avatar heads, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes online virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowchart shown in FIG. 2. In one or more additional or alternative implementations, the operations described below may be performed on one or more client devices 110, or one or more developer devices 130. In some implementations, where the operations are performed depends at least in part on compute resources, e.g., memory, processing power, or disk space. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be or include a virtual gaming server. For example, the gaming server may provide single-player or multiplayer games to a community of users that may access a "system" herein that includes online gaming server 102, data store 120, and client device 110 and/or may interact with virtual experiences using client devices 110 via network 122. In some implementations, virtual experiences (including virtual realms or worlds, virtual games, other computer-simulated environments) may be two-dimensional (2D) virtual experiences, three-dimensional (3D) virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments" or "virtual environments" herein) where multiple environments may be linked. An example of a virtual environment may be a three-dimensional (3D) environment. The one or more environments of a virtual experience 106 may be collectively referred to as a "world" or "virtual experience world" or "gaming world" or "virtual world" or "virtual space" or "universe" herein. An example of a world may be a 3D world of a virtual experience 106. For example, a user may build a virtual environment that is linked to another virtual environment created by another user. A character (avatar) of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters (avatars), decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 exceeds a threshold number, the online virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110*a* to client device 110*b*) participating in the virtual experience 106. The client devices 110 may use the experience instructions and render the virtual experience for presentation on the displays of client devices 110.

In some implementations, the control instructions may refer to instructions that are indicative of actions of a user's character (avatar) within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110*b* to client device 110*n*), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online virtual experience platform may provide users access to simplified 3D virtual object models that are represented by a mesh of a low polygon count, e.g., between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character virtual experience object (e.g., body parts, etc.) but the user may control the character (without the character virtual experience object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, animate or inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 130 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the client device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual experience virtual objects, such as in-platform currency (e.g., virtual currency), avatars, special powers, accessories, which are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through suitable application programming interfaces (hereinafter "APIs"), and thus is not limited to use in websites.

Figure 2:
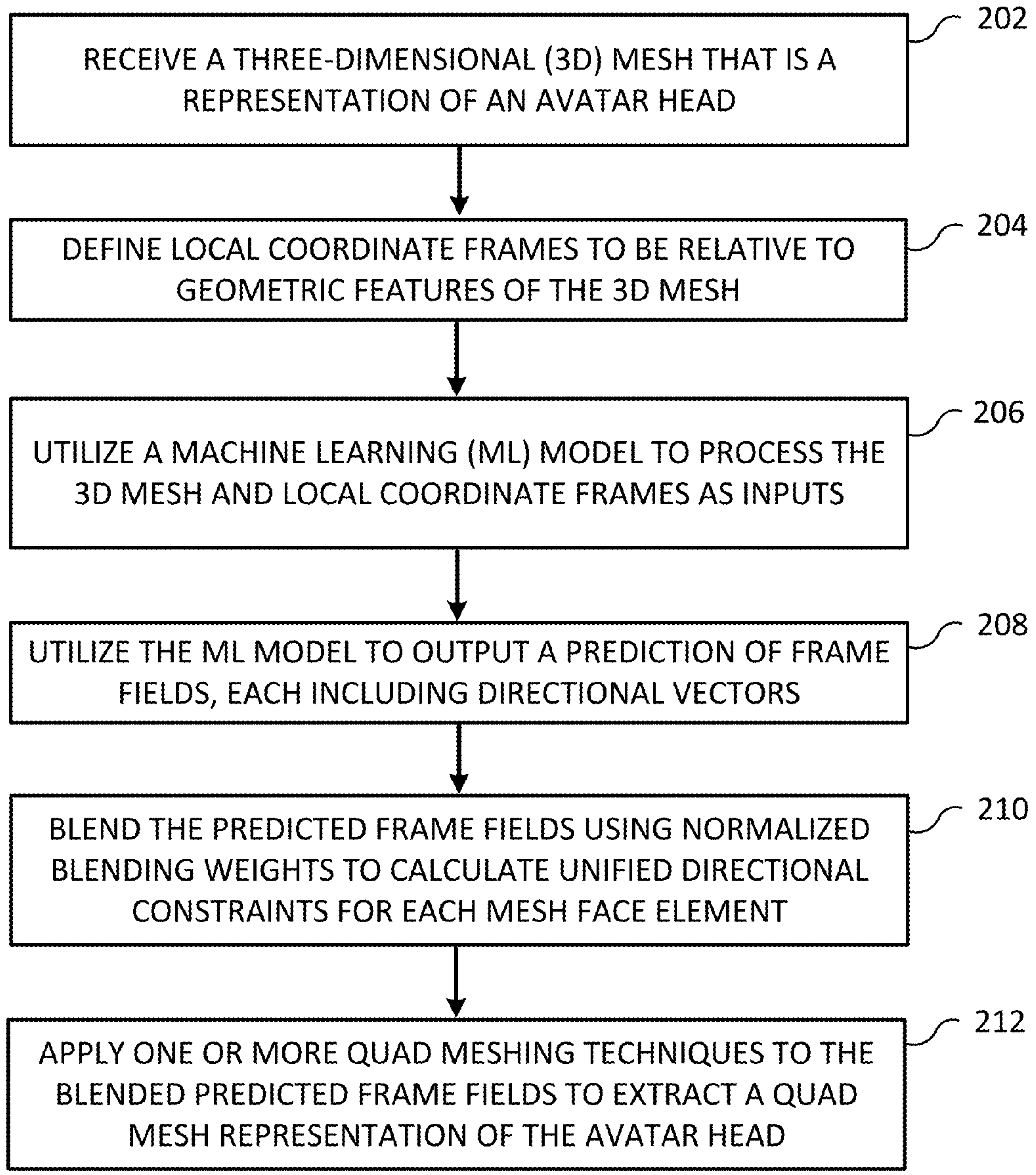
FIG. 2 is a flow diagram illustrating a method of providing mesh retopology for improved animation of three-dimensional avatar heads, in accordance with some implementations.

FIG. 2 illustrates a method of providing mesh retopology for improved animation of three-dimensional avatar heads. In various embodiments, the blocks shown in FIG. 2 and described below may be performed by any of the elements illustrated in FIG. 1.

At block 202, the system receives a 3D mesh that is a representation of an avatar head, wherein the 3D mesh includes mesh face elements. An avatar refers to a digital representation of a user or character within a virtual environment. In some implementations, an avatar can be player-controlled, e.g., moving within the virtual environment or otherwise responsive to user inputs; or an avatar can be system-controlled, e.g., not controlled by a user or player (e.g., a non-player character (NPC) avatar). In some implementations, an avatar can be a graphical embodiment of a person or an entity within a digital space, often used for communication, interaction, or representation in virtual worlds, video games, or online platforms. Within this context, the term "3D mesh" refers to a digital representation of the surface geometry (i.e., topology) of an avatar's head. The 3D mesh includes a collection of interconnected polygons, such as triangles, forming a continuous and detailed surface model. In some implementations, the received 3D mesh is a triangular mesh composed of such triangles. A mesh face element refers to a fundamental component of a 3D mesh representing a surface or a facet of an object. It typically consists of a polygonal face defined by vertices and edges, which collectively form the surface geometry of the mesh model. The 3D mesh includes a collection of such mesh face elements, each defining a portion of the avatar's head geometry. The 3D mesh can be generated using various modeling software or scanning techniques, capturing the detailed surface topology of the avatar's head. For instance, the 3D mesh may originate from computer-aided design (CAD) software, 3D scanning devices, or manual sculpting tools, among other sources.

In some implementations, the system receives the 3D mesh by acquiring it from a database of pre-existing avatar models. In some implementations, the system receives the 3D mesh upon a user submitting one or more files associated with the 3D mesh via a user interface. The system then may receive a signal that the user files have been uploaded to a specified storage location, and the system may thereafter acquire the user files from the location. In other implementations, the system receives the 3D mesh by dynamically generating the mesh based on user input. For example, users may customize a particular avatar's appearance using an interactive interface, with changes instantly reflected in the corresponding 3D mesh representation. Alternatively, in some implementations, the 3D mesh may be imported from external sources, such as online repositories or content creation platforms.

In some implementations, the received 3D mesh may undergo preprocessing steps to optimize its suitability for retopology and animation. This preprocessing can involve, for example, mesh cleaning operations to remove redundant vertices, smoothing to eliminate irregularities, and/or decimation to reduce polygon count while preserving essential details. Additionally, in some implementations, the 3D mesh may be normalized and/or scaled to ensure consistency in size and orientation across different avatar models.

Furthermore, in some implementations, the 3D mesh may include metadata or auxiliary information associated with each mesh face element, such as, e.g., surface normals, texture coordinates, or material properties. In some embodiments, the method may support various file formats for importing the 3D mesh, including industry-standard formats such as, for example, OBJ, FBX, or STL.

At block 204, the system defines local coordinate frames to be relative to geometric features of the 3D mesh. In the present context, the term "local coordinate frames" refers to coordinate systems defined at various points or regions within the 3D mesh of the avatar head. These local coordinate frames serve as reference frames that provide directional orientation information tailored to the characteristics of the avatar head's surface geometry. For instance, in some implementations, local coordinate frames may be established based on the curvature or normal vectors of the mesh faces, allowing for the alignment of coordinate axes with the principal directions of surface curvature. Alternatively or in addition, in some implementations, local coordinate frames can be defined with respect to anatomical landmarks or feature points identified within the 3D mesh, causing the axes to align with meaningful anatomical directions such as the nose, eyes, or mouth regions. In some implementations, the local coordinate frames can serve as reference axes that align with prominent features of the avatar head, such as, for example, the curvature of the forehead, the contour of the checks, or the orientation of the chin. In some implementations, local coordinate frames may be dynamically adjusted or adapted based on the specific context or requirements of the retopology process. For example, adaptive frame generation techniques can be employed to identify regions of high curvature or deformation, where additional coordinate frames may be introduced to capture local variations in surface geometry more effectively.

In some implementations, the system defines local coordinate frames based on cardinal axes, such as defining three different (e.g., uniquely-defined) local coordinate frames based on the X, Y, and Z axes of a standard reference space. This approach provides a standardized framework for establishing coordinate systems across different avatar meshes. In some implementations, the system may adaptively adjust the orientation and scale of the local coordinate frames to accommodate variations in the size and shape of the avatar heads.

In some implementations, the definition of local coordinate frames may be guided by specific anatomical landmarks or surface features identified within the 3D mesh. For example, the system can utilize facial recognition algorithms to detect key landmarks such as the eyes, nose, and mouth, and then align the local coordinate frames based on the relative positions and orientations of these landmarks.

In some implementations, the system may incorporate user-defined parameters or constraints, in order to customize the orientation and alignment of the local coordinate frames according to user preferences or specific application requirements. For example, users may specify certain regions of interest within the avatar head where finer mesh details are desired, prompting the system to prioritize the definition of local coordinate frames in those areas. In some implementations, e.g., in applications where preserving the overall shape or symmetry of the avatar head is important, the system may employ algorithms to automatically adjust the orientation of the local coordinate frames to minimize distortion and deformation during the retopologizing process.

In some implementations, defining the local coordinate frames is based on alignment with a planar reference, thereby standardizing the direction predictions across different meshes. In some implementations, this involves establishing a consistent orientation for the coordinate axes relative to a flat surface or plane within the 3D mesh. This approach enables the coordinate frames to maintain a uniform orientation across different meshes, regardless of variations in the overall shape, size, or orientation of avatar heads. This can enable users to apply the retopology techniques to a wide range of avatar models with consistent and predictable results.

At block 206, the system utilizes an ML model to process the 3D mesh and the defined local coordinate frames as inputs. An ML model refers to a computational algorithm or system that can employ machine learning to automatically learn patterns and relationships from data without being explicitly programmed. ML models operate by analyzing input data, identifying underlying patterns or structures, and making predictions or decisions based on learned knowledge. These models can adapt and improve their performance over time as they are exposed to more data, making them powerful for tasks involving complex data analysis, pattern recognition, and decision-making.

Various types of ML models may be employed in the present context of mesh retopology for avatar heads. In some implementations, convolutional neural networks (hereinafter "CNNs") may be employed for processing grid-like data structures, such as 3D meshes. CNNs utilize multiple layers of trainable filters to extract hierarchical features from input data, enabling them to capture spatial relationships and patterns effectively. In some implementations, recurrent neural networks (hereinafter "RNNs") may be employed for processing sequential data, making them suitable for tasks involving temporal or sequential dependencies, such as, e.g., processing sequences of local coordinate frames across a mesh surface. In some implementations, transformer models may be employed for processing sequential and hierarchical data, such as, e.g., processing the complex spatial and structural information present in 3D meshes of avatar heads.

In some implementations, the ML model serves as the core component responsible for analyzing and interpreting the structural characteristics of the avatar head represented by the 3D mesh, alongside the relative geometric features encapsulated within the local coordinate frames. This process enables the system to extract relevant features and patterns from the input data. In various implementations, various embodiments of the ML model may be employed, such as CNNs or RNNs, depending on the complexity and diversity of the avatar head models and their corresponding geometric features. For example, a CNN architecture may be suitable for capturing spatial dependencies within the 3D mesh, while an RNN architecture may effectively process sequential information inherent in the local coordinate frames. Furthermore, the ML model may incorporate attention mechanisms and/or graph neural networks to enhance its ability to focus on salient regions of the input data and capture intricate relationships between different parts of the avatar head.

In some implementations, the ML model undergoes a training phase using annotated datasets comprising diverse examples of avatar heads with manually-created topologies. This training process involves iteratively adjusting the model's parameters to minimize prediction errors and optimize the model's performance in generating accurate frame fields. Additionally, techniques such as transfer learning or data augmentation may be employed to leverage pre-trained models or augment the training dataset with synthetic data, respectively. Once trained, the ML model can efficiently process new instances of 3D mesh representations and associated local coordinate frames, leveraging its learned knowledge to generate predictions of frame fields tailored to each specific avatar head. In some implementations, these frame fields can serve as directional guidance signals that inform the subsequent quad mesh extraction process.

In some implementations, the ML model includes a feature extraction block that uses the 3D mesh as input. The feature extraction block functions to extract relevant geometric and structural features from the 3D mesh. In various implementations, the feature extraction block may employ various techniques, such as, e.g., convolutional or graph-based operations, to analyze the spatial characteristics of the mesh, identify important landmarks or regions, and capture intricate patterns inherent in the geometry of the avatar head.

In some implementations, the feature extraction block includes a learned diffusion layer. A learned diffusion layer is a specialized neural network component designed to capture and propagate information across the mesh surface. This diffusion layer utilizes diffusion processes inspired by heat or mass diffusion equations to iteratively spread feature information throughout the mesh. By employing the learned diffusion layer within the feature extraction block, the ML model can encode spatial relationships and geometric properties of the avatar head mesh, in order to extract features from it more accurately and effectively.

In some implementations, the learned diffusion layer may take the form of a DiffusionNet component of the ML model. A DiffusionNet is a type of neural network architecture specifically designed for learning on surfaces, such as 3D meshes. It leverages techniques from geometric deep learning to efficiently process and extract features from the input mesh data while preserving the geometric structure.

In some implementations, the ML model includes a feedforward network that uses the defined local coordinate frames as inputs. This feedforward network architecture is designed to efficiently process the spatial information encoded within the local coordinate frames and extract relevant features for directional constraint prediction. By leveraging the defined local coordinate frames, which provide a consistent reference frame relative to the geometric features of the avatar head mesh, the feedforward network can more effectively capture the structural characteristics and topology of the mesh. In some implementations, the feedforward network may additionally use the feature or features extracted from a learned diffusion layer as input, such as the learned diffusion layer described above.

In some implementations, the feedforward network utilized within the ML model may take the form of a multilayer perceptron (hereinafter "MLP"). An MLP consists of multiple layers of nodes, each connected to the next layer, with each node applying a nonlinear activation function to the weighted sum of its inputs. This architecture enables the MLP to learn complex patterns and relationships within the input data, making it well-suited for tasks such as feature extraction and prediction. By employing an MLP as part of the ML model, the system can effectively process the spatial information provided by the defined local coordinate frames and learn to predict frame fields that accurately capture the directional constraints of the avatar head mesh.

At block 208, the system utilizes the ML model to output a prediction of a plurality of frame fields, with each of the frame fields including directional vectors. These frame fields represent the orientations of local coordinate frames across the surface of the 3D mesh. The directional vectors indicate the preferred directions for quad meshing of the avatar head. For example, the frame fields may specify particular alignment of quad elements along facial features such as the nose, mouth, and eyes that enables smoother animation transitions and more realistic facial expressions.

In some examples, three different frame fields can be predicted, one frame field for each of three local coordinate frames that are defined in block 204. Each frame field comprises two sets of tangent vectors, with each set representing the directional vectors aligned with the local coordinate frame. These tangent vectors provide a local reference system for each mesh face, capturing its orientation relative to the defined coordinate frame.

In various implementations, the ML model may employ various techniques to predict the frame fields based on the input 3D mesh and local coordinate frames. For example, in some implementations, the system can utilize CNNs or RNNs trained on a dataset of annotated 3D meshes to learn the mapping between mesh geometry and frame field orientations. Alternatively, in some implementations, the system can incorporate attention mechanisms into the ML model to dynamically focus on different regions of the mesh. This may have the effect of enhancing the accuracy of the frame field predictions, particularly in areas with complex geometry or fine details.

In some implementations, the prediction of frame fields may involve post-processing operations to refine the output vectors and ensure consistency across neighboring mesh elements. This can include, for example, smoothing algorithms to reduce noise in the predictions and/or regularization techniques to enforce continuity between adjacent frame fields. Additionally, the system may apply normalization procedures to scale the directional vectors appropriately for maintaining consistent magnitudes across the mesh surface. Normalization ensures that the directional vectors maintain their relative importance and do not introduce biases based on their original scales.

In some implementations, the ML model may output frame fields with varying levels of detail, allowing for adaptive refinement based on the complexity of the input mesh and the desired quality of the quad mesh representation. For example, in regions with intricate surface features or high curvature, the frame fields may contain more directional vectors to capture finer nuances in the mesh geometry. Conversely, in smoother areas with less pronounced features, the frame fields may consist of fewer vectors to optimize computational efficiency while maintaining visual fidelity.

In some implementations, the predicted frame fields include vectors for orthogonal directions relative to each local coordinate frame. These vectors delineate the preferred orientations for quad elements within the 3D mesh. For example, in regions of the mesh corresponding to prominent facial features such as the nose or cheeks, the predicted frame fields may include orthogonal vectors pointing in directions perpendicular to the local surface, ensuring that quad elements are aligned with the contours of these features.

Additionally, in some implementations, the inclusion of orthogonal vectors within the predicted frame fields enables the system to capture variations in surface curvature and topology across different regions of the 3D mesh. By providing directional guidance for quad mesh generation along multiple axes, the predicted frame fields facilitate the creation of quad meshes that adapt seamlessly to the complex geometry of the avatar head. For example, in areas where the surface exhibits significant curvature changes or irregularities, the orthogonal vectors may adjust dynamically to align quad elements in a manner that preserves surface continuity and minimizes distortion during animation playback.

At block 210, the system blends the predicted frame fields using normalized blending weights to calculate unified directional constraints for each mesh face element. In some implementations, this blending process involves combining the directional vectors from multiple frame fields in a manner that enables smooth transitions between adjacent regions of the 3D mesh.

In some implementations, the system uses a weighted average approach for the blending, where the directional vectors from each frame field are multiplied by corresponding blending weights and then summed together. These blending weights can be determined based on factors such as the proximity of each frame field to the current mesh face element and/or the confidence level of the predictions associated with each frame field. For example, frame fields that are closer to the mesh face element and have higher prediction accuracies may be assigned higher blending weights to exert greater influence on the unified directional constraints.

In various implementations, the system may employ more sophisticated blending techniques, such as triplanar mapping or spherical blending, to address challenges associated with regions of the mesh that exhibit complex surface geometry or sharp changes in curvature. Triplanar mapping involves blending directional vectors along three orthogonal axes (e.g., X, Y, and Z) to ensure smooth transitions across different surface orientations. Similarly, spherical blending involves projecting directional vectors onto a virtual sphere centered at the mesh face element and blending them based on their angular deviations from the surface normal.

In various implementations, the system may incorporate additional constraints or heuristics during the blending process to enhance the quality of the unified directional constraints. For example, constraints derived from known anatomical features of the avatar head, such as the orientation of facial muscles or the direction of skin folds, may be integrated to guide the blending of frame fields in a manner that preserves anatomical realism. Additionally, the system may apply regularization techniques to mitigate artifacts such as discontinuities or excessive smoothing in the calculated directional constraints.

In some implementations, the blending process is based on a linear combination of the predicted vectors, where each directional vector contributes to the unified directional constraints in proportion to its blending coefficient. These blending coefficients can be determined based on a face normal direction for the 3D mesh, which serves as a reference for the orientation of the mesh face element relative to the surrounding environment. By aligning the blending coefficients with the face normal direction, the system ensures that the blending process accounts for the local surface curvature and orientation.

For example, when blending the predicted frame fields to calculate the unified directional constraints for a particular mesh face element, the system may assign higher blending coefficients to directional vectors that align closely with the face normal direction. Conversely, directional vectors that deviate significantly from the face normal direction may be assigned lower blending coefficients. In some examples, directional vectors with deviations exceeding a certain threshold, such as 45 degrees or more (or other amount), can be considered significant deviations. In such cases, the blending coefficients assigned to these vectors may be reduced proportionally to the magnitude of their deviation. Vectors deviating only slightly from the face normal direction may retain higher blending coefficients, while those deviating significantly may have substantially lower coefficients. In an example scenario, for vectors deviating less than 15 degrees from the face normal direction, the blending coefficients range from 0.8 to 1.0, indicating high influence on the blending process. For vectors deviating more than 45 degrees from the face normal direction, the coefficients can be reduced to a range of 0.1 to 0.3, representing a significant decrease in influence. This approach enables directional vectors that are more closely aligned with the local surface orientation to exert greater influence on the blended result, while vectors with larger deviations contribute less significantly to the final unified directional constraints.

In some implementations, the system may dynamically adjust the blending coefficients based on additional factors such as the curvature or smoothness of the mesh surface. For instance, regions of the mesh with higher curvature or sharper features may require more emphasis on directional information aligned with the face normal direction to maintain geometric fidelity during blending. In some implementations, to provide more emphasis on directional information aligned with the face normal direction in regions of the mesh with higher curvature or sharper features, the system can adjust the blending coefficients accordingly. For example, in regions of high curvature or sharp features where geometric fidelity is crucial, the system may prioritize directional vectors aligned with the face normal direction by assigning them higher blending coefficients. This ensures that the resulting quad mesh accurately reflects the details and contours of the original mesh surface. Conversely, vectors deviating significantly from the face normal direction, which may introduce distortions or inaccuracies in the quad mesh, can be assigned lower coefficients.

In some implementations, after calculating the unified directional constraints for each mesh face element, the system may proceed to transform these constraints into a coordinate system that ensures uniformity across the entire 3D mesh. This transformation process involves redefining the directional vectors within a consistent reference frame that remains invariant across different regions of the mesh. For example, the system may employ mathematical techniques such as rotation or translation to align the directional vectors with a predefined global coordinate system. This global coordinate system serves as a standardized reference frame that applies uniformly to all mesh face elements, regardless of their local orientations or positions within the 3D mesh.

At block 212, the system applies one or more quad meshing techniques to the blended predicted frame fields to extract a quad mesh representation of the avatar head. Quad meshing involves converting the triangular mesh representation of the avatar head into a mesh composed primarily of quadrilateral elements, which contain properties that are more suitable for animation and rendering purposes. In various implementations, various quad meshing algorithms and techniques may be employed in this step, depending on factors such as, e.g., the desired level of detail, the complexity of the original mesh, and computational efficiency considerations.

In some implementations, the quad meshing involves the use of an anisotropic variation of Mixed-Integer Quadrangulation (hereinafter "MIQ"). MIQ is a quad meshing algorithm that optimizes the placement of vertices to generate high-quality quad meshes. By incorporating anisotropic considerations, such as the directional constraints derived from the blended predicted frame fields, the system can adapt the quad meshing process to better align with the underlying features and characteristics of the avatar head geometry.

In various other implementations, the system may utilize other quad meshing techniques, such as, for example, feature-based quad meshing or constrained Delaunay triangulation, to extract the quad mesh representation. Feature-based quad meshing methods leverage geometric features of the input mesh, such as sharp edges or creases, to guide the placement of vertices and edges in the quad mesh. Constrained Delaunay triangulation techniques ensure that the resulting quad mesh conforms to certain geometric constraints or requirements, such as local feature alignment or curvature preservation. In some implementations, the system combines multiple quad meshing techniques or adapts them based on specific characteristics of the input mesh.

In some implementations, once the quad mesh representation is extracted, the system further refines or optimizes it to improve its quality and suitability for animation purposes. In various implementations, this may involve one or more additional processing steps such as, e.g., mesh smoothing, edge flipping, or boundary correction to enhance the overall appearance and performance of the quad mesh.

In some implementations, the ML model uses the unified directional constraints as learned output to guide the extraction of the quad mesh representation. This approach enables the ML model to learn and adapt to the specific characteristics and requirements of the input mesh, resulting in a quad mesh that is better aligned with the intended shape and structure of the avatar head. In some implementations, rather than relying solely on predefined rules or parameters, the ML model learns from the directional constraints derived from the input mesh, enabling it to have improved outcomes for decisions regarding vertex placement and mesh topology.

In some implementations, the learned output corresponds to a frame field estimation procedure based on directional constraints. By using the directional constraints learned by the ML model, the frame field estimation procedure can accurately predict the orientations of quad elements within the mesh. In some implementations, this estimation procedure relies on the inherent geometric properties and structural characteristics of the input mesh.

In some implementations, the system transfers texture from the original 3D mesh representation to the quad mesh representation of the avatar head to generate a retopologized 3D avatar head for use in display and animation. The texture transfer process involves transferring the texture from the original 3D mesh representation onto the newly generated quad mesh representation. In some implementations, the system procedurally cuts the retopologized mesh, then performs UV unwrapping of the cut mesh as a Least-Squares Conformal Map. "UV" refers to the U and V axes which represent the horizontal and vertical directions, respectively, in the texture space, analogous to the X and Y axes in a Cartesian coordinate system. The system then performs mapping from the original mesh texture to the retopologized mesh's UV texture.

In some implementations, in order to map the original texture to the new UV texture, the system performs a series of operations. For each UV texel, the system: computes the element index and barycentric coordinate on the retopologized mesh; projects the corresponding 3D point from the retopologized surface onto the input mesh surface; computes the color at a projected point on the input mesh surface; and sets the texel color to the input mesh surface color.

In some implementations, applying the one or more quad meshing techniques includes using a quadrilateral mesh extraction algorithm to generate, based on the unified directional constraints, a quad mesh with reduced complexity. In some implementations, the system uses quad meshing techniques first to compute a parametrization, and then to extract a quad mesh. In some implementations, the system uses an anisotropic variation of MIQ to compute the parametrization, which, given directional constraints, solves for an as-smooth-as-possible field. The system then cuts the mesh around singularities, before computing a seamless parametrization. The parametrization is then used to extract a quad mesh with a quadrilateral mesh extraction algorithm. Quadrilateral mesh extraction operates by analyzing the geometric and topological properties of the input mesh, such as vertex connectivity and surface curvature, to determine the optimal placement and orientation of quadrilateral elements. By leveraging this information, the system can intelligently partition the input mesh into quadrilateral elements while minimizing distortion and preserving mesh quality. Additionally, in some implementations, quadrilateral mesh extraction may incorporate various optimization strategies, such as edge flipping and vertex repositioning.

In some implementations, the extracted quad mesh representation of the avatar head is employed within an avatar creation process to create an avatar within a virtual environment. In some implementations, users (including, e.g., developers and artists) engage with the extracted quad mesh representation within a user interface designed for avatar creation within a virtual environment. In some implementations, this interface provides tools and controls for manipulating the quad mesh structure, allowing users to customize various aspects of the avatar's appearance and behavior. In some implementations, users can interactively sculpt and modify the quad mesh to achieve desired facial features, expressions, and proportions.

In some implementations, the user interface additionally facilitates integration of elements such as textures, materials, and animations onto the quad mesh representation. Through the interface, users can apply texture maps and paint directly onto the quad mesh surface. Moreover, in some implementations, developers can incorporate animation controls and rigging tools within the interface, allowing users to define and customize dynamic movements and expressions for the avatar.

Figure 3:
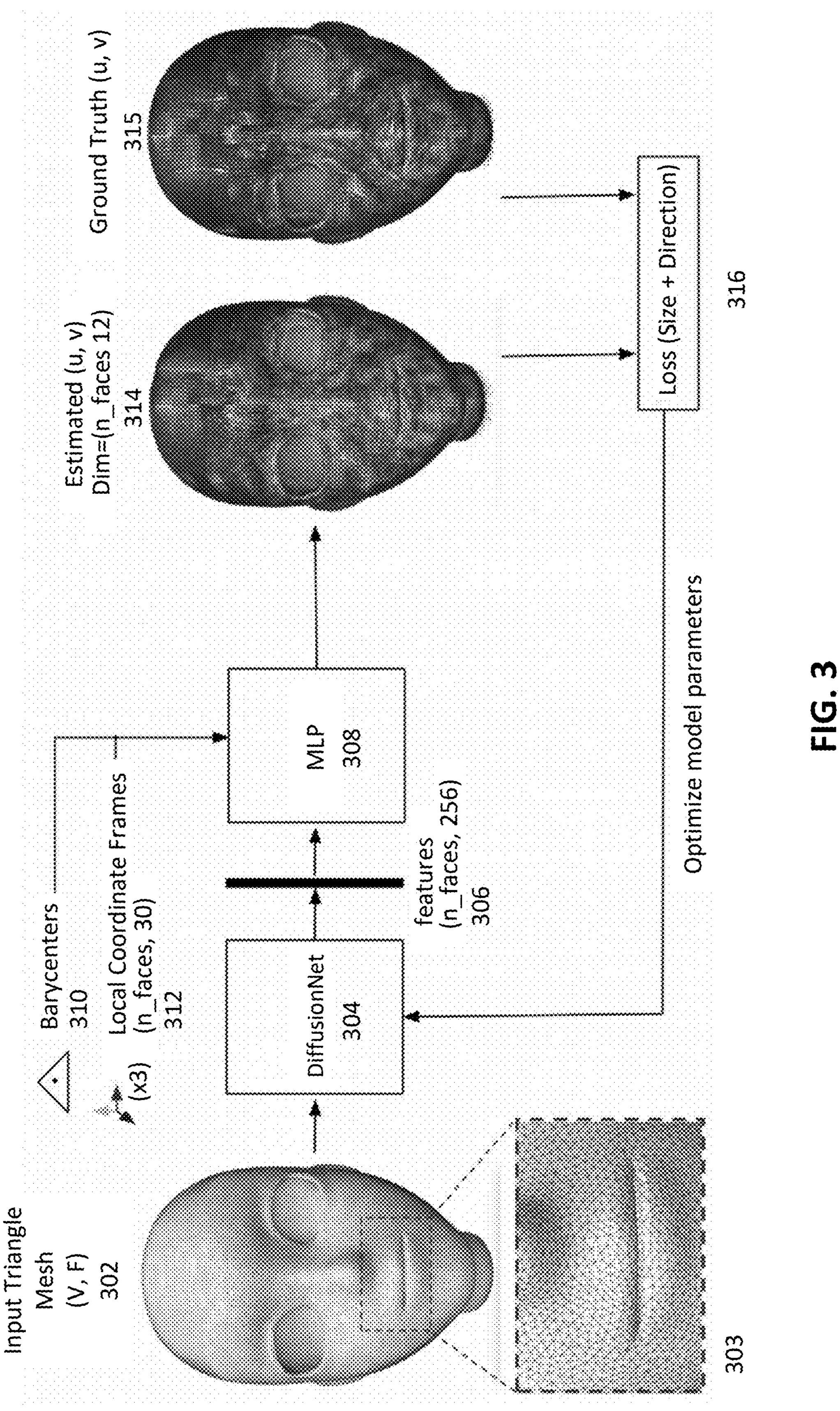
FIG. 3 is a diagram illustrating a method of providing mesh retopology of three-dimensional avatar heads using machine learning techniques, in accordance with some implementations.

FIG. 3 is a diagram illustrating a method of providing mesh retopology of 3D avatar heads using ML techniques, in accordance with some implementations. The figure illustrates the process of converting an input triangle mesh representation of an avatar's head into a quadrilateral mesh representation using ML techniques. The left side of the figure depicts the input triangle mesh 302, denoted as (V, F), where V represents the vertices and F represents the faces or triangles constituting the mesh. The input triangle mesh accurately captures the geometry and topology of the avatar's head. A magnified region 303 within the input triangle mesh 302 focuses on the lips region of the avatar's head, revealing the intricate arrangement of triangle mesh elements forming the lips' geometry and topology. The input triangle mesh 302 serves as input data for a learned diffusion layer such as DiffusionNet block 304, which is a component within an ML model. The DiffusionNet block 304 operates by extracting features 306 from the input triangle mesh, represented as (n_faces, 256). These features 306 capture important characteristics of the mesh geometry and topology. Here, "n_faces" refers to the number of faces in the input triangle mesh, indicating the total count of triangular elements comprising the mesh's surface. The value "256" represents the dimensionality of the extracted features. In this context, each face of the triangle mesh contributes to the creation of a feature vector with 256 elements, capturing various characteristics and details of the geometry and topology of the mesh.

A multi-layer perceptron 308, or MLP, receives as input the features 306 extracted by the DiffusionNet block 304. The MLP 308 also receives other inputs for processing. These inputs include barycenters 310, which are points representing the centers of mass for each face in the mesh, and three local coordinate frames 312 represented as (n_faces, 30). As above, "n_faces" refers to the number of faces in the input triangle mesh, and the value "30" refers to the dimensionality of each local coordinate frame vector. In this context and example, each face of the triangle mesh contributes to the creation of a local coordinate frame vector consisting of 30 elements, encoding information about the orientation and alignment of the local coordinate frame relative to the geometric features of the mesh. The barycenters 310 provide spatial information about the distribution of faces within the mesh, while the local coordinate frames 312 define orientations relative to specific geometric features. For example, the local coordinate frames 312 may align with the X, Y, and Z axes or be defined based on planar references.

The MLP 308 utilizes these inputs to generate a quadrilateral mesh representation of the avatar's head. Two such quad meshes are depicted in the figure: mesh 314 shows the Estimated (u, v) directions with dimensions (n_faces, 12). Here, the value "12" indicates the dimensionality of the estimated (u, v) directions for each face in the quad mesh representation. Each face contributes to a set of directional vectors in the (u, v) plane, with 12 elements specifying the magnitude and direction of these vectors. The mesh 315 shows the Ground Truth (u, v) directions. These directions correspond to vectors indicating the orientations of quadrilateral elements within the mesh. The output of estimated quad mesh 314 and ground truth quad mesh 315 undergoes evaluation through a loss function 316, which assesses the deviation in size and direction between the estimated and ground truth meshes. This loss function 316 provides the deviation to DiffusionNet block 304 and thus is utilized to optimize the model parameters within the DiffusionNet block 304, providing improved performance and accuracy in future ML processing iterations.

Figures 4A, 4B:
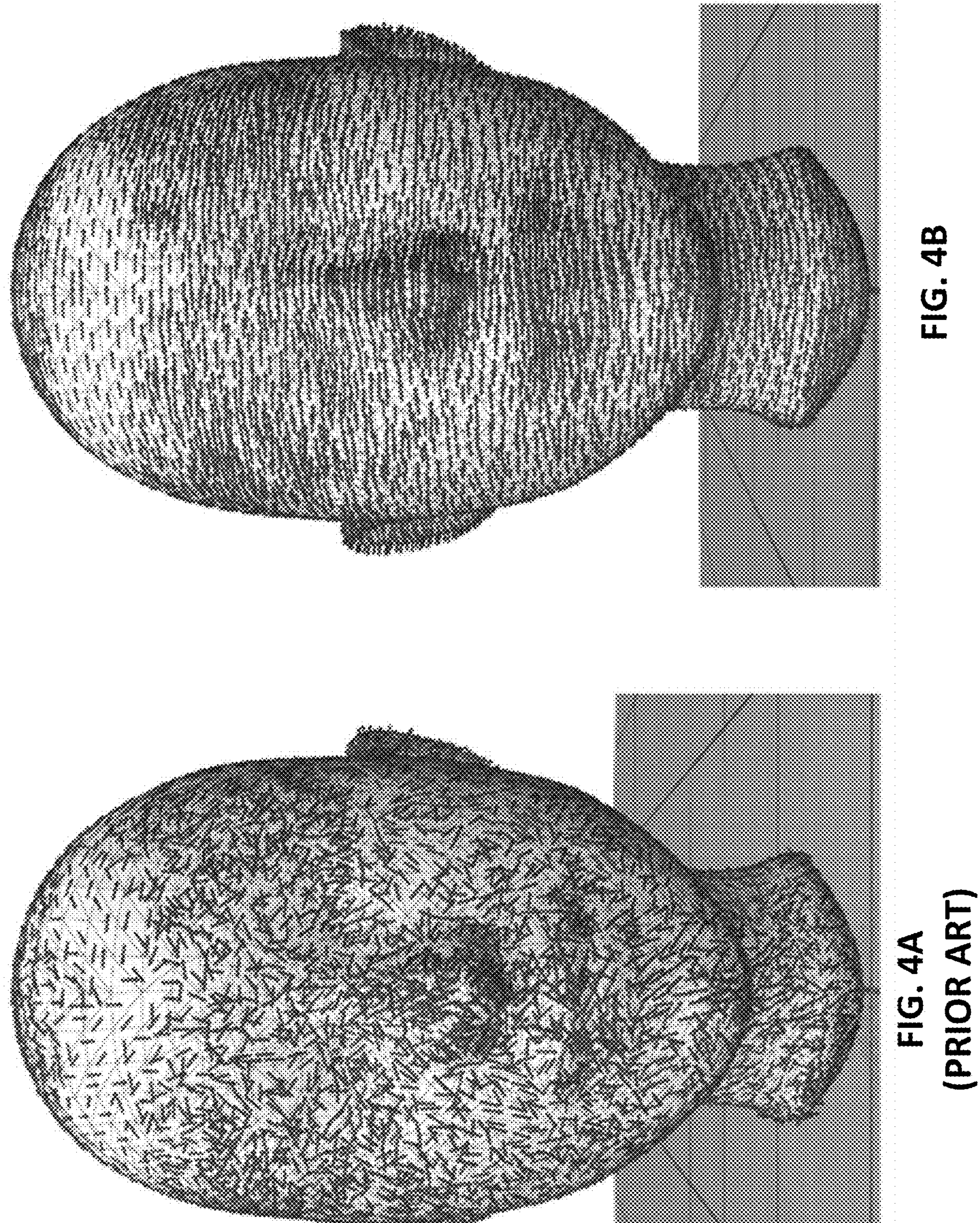
FIG. 4A is a diagram illustrating a prior art example of a 3D mesh representation of an avatar's head, depicting noisy results of quad meshing.
FIG. 4B is a diagram illustrating an example of a 3D mesh representation of an avatar's head depicting smooth blended results of quad meshing, in accordance with some implementations.

FIG. 4A and FIG. 4B illustrate 3D mesh representations of an avatar's head, and benefits of defining local coordinate frames that are consistent across the data in order to extract a quad mesh representation of an avatar's head.

FIG. 4A illustrates an example of a prior 3D mesh representation of an avatar's head, showcasing numerous arrows distributed across the mesh surface. Each arrow symbolizes a local axis situated within the tangent plane of a face of the mesh. These local axes are aligned randomly with respect to the mesh geometry, highlighting the lack of consistency in the local coordinate frames associated with each face element. This inconsistency poses challenges for downstream processes such as machine learning-based model training and mesh processing.

In contrast, FIG. 4B depicts a similar 3D mesh representation of an avatar's head, but with a notable difference in the alignment of the arrows on the mesh surface as provided by techniques described herein. In this illustration, the arrows are uniformly aligned according to defined local coordinate frames that exhibit consistency across the dataset. This consistency is achieved by aligning each local axis parallel to a specific direction within the tangent plane of the face, such as the xz-plane. By adopting this approach for computing the local frames, the resulting coordinate frames exhibit uniformity and coherence, enhancing the quality and reliability of subsequent processing steps.

The process illustrated in FIG. 4B represents a refinement over the methodology depicted in FIG. 4A, wherein the definition of consistent local coordinate frames significantly improves both training and test accuracy during ML model training. By providing each face element with a coherent and standardized local coordinate frame, the system can effectively capture and represent the underlying geometric features of the 3D mesh. This enhancement not only enhances the performance of the ML model, but also contributes to the overall quality and accuracy of subsequent operations such as feature extraction, quad meshing, and texture transfer.

Figure 5B:
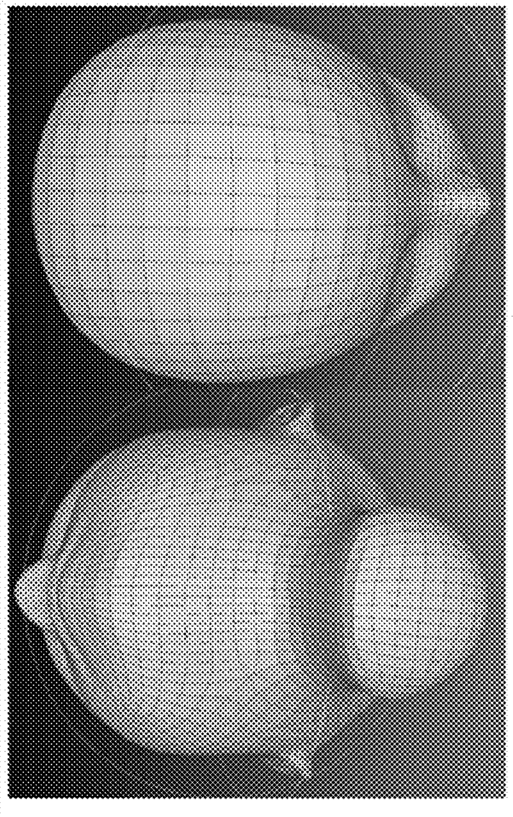
FIG. 5B is a diagram illustrating an example of a 3D mesh representation of an avatar's head depicting consistent application of quad meshing, in accordance with some implementations.
Figure 5A:
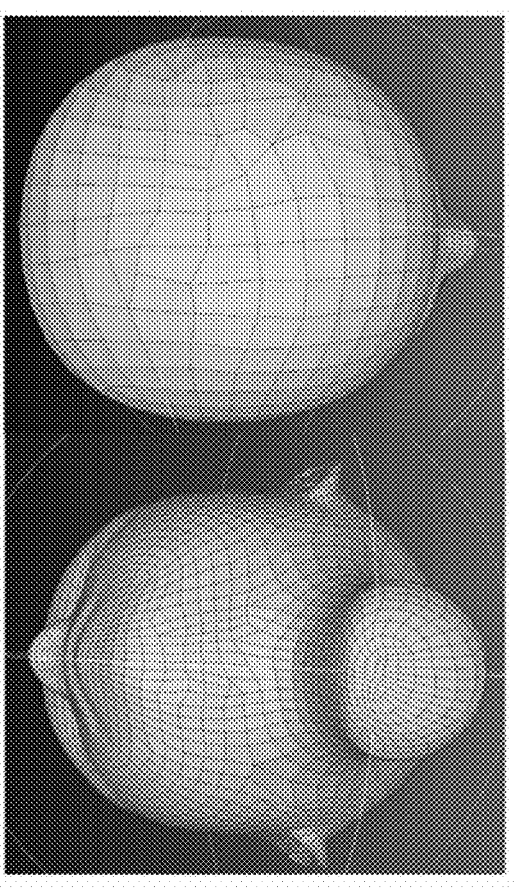
FIG. 5A is a diagram illustrating a prior art example of a 3D mesh representation of an avatar's head, depicting uneven application of quad meshing.

FIG. 5A and FIG. 5B illustrate 3D mesh representations of an avatar's head, and benefits of using triplanar mapping to produce smooth blended results in the output quad mesh representation of the avatar's head.

FIG. 5A illustrates an example of a prior 3D quadrilateral mesh representation of an avatar's head, depicted from both a top and bottom angle. The quad mesh exhibited in this illustration suffers from a common problem encountered in mesh processing, which is uneven application of quad meshing due to noisy predictions around singularities. This noise manifests as irregularities and inconsistencies in the distribution and alignment of quadrilateral elements across the surface of the avatar's head, such as the irregular quadrilaterals, skewed edges, and unaligned vertices shown in particular locations of the mesh in the figure. These imperfections can detract from the overall quality and visual appeal of the mesh, impacting downstream applications such as animation and rendering.

In contrast, FIG. 5B illustrates a similar 3D quadrilateral mesh representation of an avatar's head, but with a significant improvement in mesh quality and consistency as provided by techniques described herein. In this illustration, the quad mesh is the result of a smooth blending process, characterized by uniform application across the entire surface of the avatar's head. This consistency is achieved through the implementation of triplanar mapping techniques, which leverage three plane-aligned local coordinate frames to mitigate the effects of noisy predictions around singularities. By blending the predicted frame fields using triplanar mapping, the system ensures that the quad mesh maintains smoothness and uniformity, enhancing its suitability for various applications in computer graphics and animation.

Figure 6:
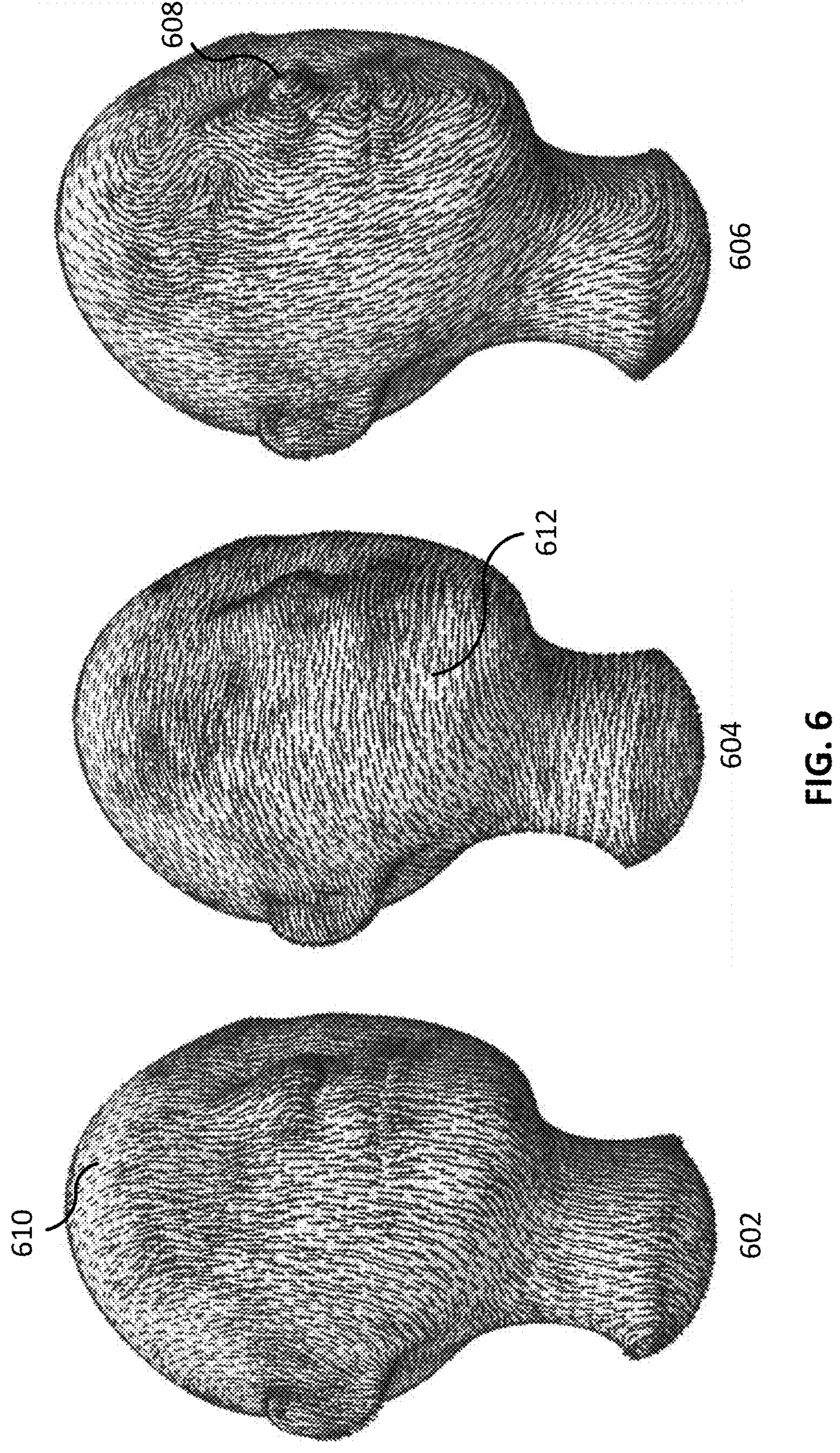
FIG. 6 illustrates an exemplary process of defining triplanar-aligned local coordinate frames to achieve smooth blended results, in accordance with some implementations.

FIG. 6 illustrates 3D mesh representations of an avatar's head that show an exemplary process of defining triplanar-aligned local coordinate frames to achieve the smooth blended results shown in FIG. 5B, described above. FIG. 6 illustrates an approach to addressing singularity issues encountered in prior mesh representations, such as the mesh representation depicted in FIG. 5A. In FIG. 6, three distinct 3D mesh representations of an avatar's head 604, 606, and 608 are presented, each shown with numerous arrows distributed across the surface of the mesh. Each mesh representation features the arrows pointing in different directions, symbolizing the definition of three unique local coordinate frames. These local coordinate frames serve as the bases upon which frame fields will be estimated.

The arrows' varied orientations in each mesh representation correspond to the directions of the three uniquely-defined local coordinate frames. Each local basis vector field is aligned with a different Cartesian axis. Each depicted mesh representation shows the presence of singularities within each local frame vector field. In the figure, the singularities within each local frame vector field can be observed as points where the directional vectors exhibit discontinuities or abrupt changes in direction. These singularities typically occur at regions of high curvature or complex geometry on the mesh surface, such as sharp corners, edges, or concave regions. An example of such a singularity is shown in region 608, at the tip of the avatar's nose. Additionally, singularities may manifest as areas where the directional vectors become aligned or parallel, indicating a loss of local frame coherence. Examples of such singularities can be seen in region 610 and region 612. These singularities occur in non-overlapping, predictable areas on the surface of the mesh. Thus, the mesh's overall smoothness and consistency are maintained.

The system implements a blending strategy that leverages predictions from the most regular local frame on each face. Specifically, the approach involves predicting three distinct sets of tangent vectors within the three local frames and subsequently blending them based on the local frame's regularity. The blending process employs a linear combination of the predicted vectors, with blending coefficients determined by the face normal direction, which is correlated with the regularity of the local frame vector field. Regularity refers to the consistency and smoothness of the directional vectors within the local coordinate frame. For example, a regular local frame vector field would exhibit smoothly varying tangent vectors across the mesh surface, while an irregular field may have abrupt changes or discontinuities in the directional vectors. This correlation with the regularity of the local frame vector field enables the system to prioritize predictions from local frames exhibiting higher regularity, thereby minimizing the influence of singularities and promoting smoother, more uniform mesh representations across the avatar's head.

Example Implementations

Some example implementations of one or more features described herein can include the following.

Triangular Mesh Processing: In some implementations, triangular meshes commonly used in avatar modeling are processed. A method can include receiving a 3D mesh representing an avatar's head composed of triangular elements. Local coordinate frames are defined relative to geometric features of the mesh, facilitating precise directional guidance. An ML model employing a multilayer perceptron processes the mesh and local coordinate frames, predicting frame fields to enhance mesh quality. The predicted frame fields, comprising directional vectors, are then blended using normalized weights to calculate unified directional constraints for each mesh element. Finally, quad meshing techniques are applied to extract a quad mesh representation of the avatar's head, addressing the limitations of triangular meshes and improving animation capabilities.

Anisotropic Quadrangulation: In some implementations, anisotropic Mixed-Integer Quadrangulation (MIQ) is used to compute parameterizations of the 3D mesh. This approach allows for the generation of a quad mesh with tailored anisotropic properties, optimizing mesh topology for specific animation requirements. By incorporating the parameterization into the quad mesh extraction process, the resulting representation maintains fidelity to the original avatar head geometry while improving computational efficiency and animation performance. Additionally, the system transfers texture information from the original triangular mesh to the quad mesh, ensuring continuity in visual appearance and allowing the quad mesh representation to be used in a variety of virtual environments.

Local Coordinate Frame Alignment: In some implementations, the challenge of defining consistent local coordinate frames across different meshes is addressed. By aligning local frames with planar references, the system standardizes direction predictions, promoting uniformity in mesh processing outcomes. This approach not only enhances the accuracy and reliability of frame field predictions but also facilitates model training by minimizing inconsistencies between training and testing data. Through the integration of alignment-based techniques, both training and test accuracy significantly improve, leading to more robust and reliable machine learning models for mesh processing tasks.

Blending for Singularities Mitigation: Some implementations include blending predicted frame fields to mitigate singularities commonly encountered in mesh representations. By employing triplanar mapping across three plane-aligned local coordinate frames, the system achieves smooth and consistent blending, overcoming the challenges posed by noisy predictions around singularities. This technique causes quad meshing to be evenly applied across the avatar's head, enhancing the visual quality and stability of animation sequences. The blending process utilizes linear combinations of predicted vectors, with blending coefficients determined based on face normal directions, effectively minimizing artifacts and improving mesh uniformity.

User Interface Integration: In some user-centric implementations, described techniques integrate seamlessly into user interfaces for intuitive mesh processing. Users, including developers and animators, can leverage the system's capabilities through user-friendly interfaces that streamline mesh retopology tasks. Through interactive tools and visualizations, users can manipulate and optimize mesh representations in real-time, enhancing creativity and productivity in avatar creation and animation workflows. The system's efficiency and resource optimization further contribute to lowering compute time and increasing overall resource efficiency, making it a valuable asset for users, e.g., users within the animation and video game industries.

Figure 7:
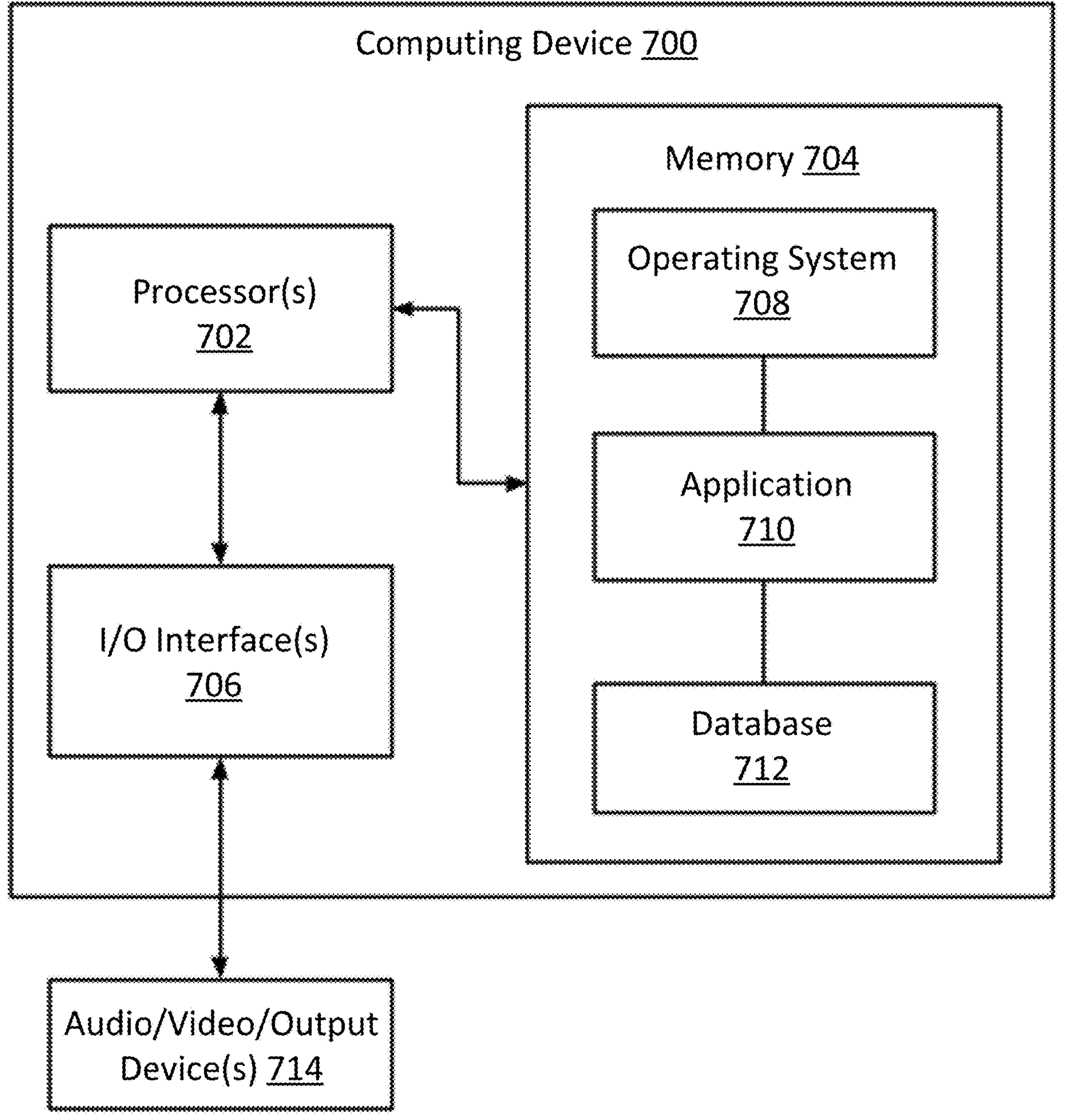
FIG. 7 is a block diagram that illustrates an example computing device, in accordance with some implementations.

FIG. 7 is a block diagram of an example computing device 700 which may be used to implement one or more features described herein. In one example, device 700 may be used to implement a computer device (e.g., 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable computer-readable or processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, and a database 712 that may store data used by the components of device 700. In some implementations, applications 710 can include instructions that enable processor 702 to perform the functions (or control the functions of) described herein, e.g., some or all of the methods described with respect to FIG. 2. For example, applications 710 can include a module that implements one or more machine learning models used in techniques described herein, e.g., learned diffusion layers such as DiffusionNet, multi-layer perceptron, PointNet, or transformer self-attention layers. Applications 710 can include one or both of the loss functions of FIG. 3, e.g., a) a squared L2-difference in the size similarity between the prediction and the ground truth, and/or b) a squared L2-difference in the directional similarity between the prediction and the ground truth. Database 712 (and/or other connected storage) can store various data used in described techniques, including input meshes of an avatar, quad meshes, output retopologized meshes, features 306, barycenters, local coordinate frames, etc.

Elements of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 120), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can a variety of devices including a user input device (e.g., a mouse, etc.) that can be used to receive user input, audio output devices (e.g., speakers), and a display device (e.g., screen, monitor, etc.) and/or a combined input and display device, which can be used to provide graphical and/or visual output.

For ease of illustration, FIG. 7 shows one block for each of processor 702, memory 704, I/O interface 706, and software blocks of operating system 708 and virtual experience application 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the online virtual experience server 102 is described as performing operations as described in some implementations herein, any suitable component or combination of components of online virtual experience server 102, client device 110, or similar system, or any suitable processor or processors associated with such a system, may perform the operations described.

Device 700 can be a server device or client device. Example client devices or user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200 and other described techniques) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (Saas) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, blocks, operations, or computations may be presented in a specific order, the order may be changed in different particular implementations. In some implementations, multiple steps or operations shown as sequential in this specification may be performed at the same time.

What is claimed is:

1. A computer-implemented method comprising:

receiving a three-dimensional (3D) mesh that is a representation of an avatar head, wherein the 3D mesh includes a plurality of mesh face elements that collectively define a mesh surface;

defining a plurality of local coordinate frames for respective ones of the mesh face elements, the local coordinate frames defined relative to geometric features of the 3D mesh including a face normal direction and tangent vectors defined on the mesh surface;

utilizing a machine learning (ML) model to:

process the 3D mesh and the defined local coordinate frames as inputs, and output a prediction of a plurality of frame fields, each of the frame fields comprising a plurality of directional vectors relative to a corresponding one of the local coordinate frames;

blending the predicted frame fields using normalized blending weights based on the face normal direction of each mesh face element and implemented as a linear combination of the directional vectors to calculate unified directional constraints for each mesh face element; and applying one or more quad meshing techniques using the unified directional constraints to extract a quad mesh representation of the avatar head.

2. The method of claim 1, wherein the 3D mesh is a triangular mesh.

3. The method of claim 1, wherein the ML model comprises a feature extraction block that uses the 3D mesh as input.

4. The method of claim 3, wherein the feature extraction block comprises a learned diffusion layer.

5. The method of claim 1, wherein the ML model comprises a feedforward network that uses the defined local coordinate frames as inputs.

6. The method of claim 1, further comprising:

transforming the unified directional constraints into a coordinate system that applies uniformly across the entire 3D mesh.

7. The method of claim 1, wherein applying the one or more quad meshing techniques comprises using a quadrilateral mesh extraction algorithm to generate, based on the unified directional constraints, the quad mesh representation having a reduced number of mesh face elements relative to the received 3D mesh.

8. The method of claim 1, wherein applying the one or more quad meshing techniques comprises:

applying an anisotropic variation of Mixed-Integer Quadrangulation to compute a parameterization of the 3D mesh; and using the parameterization of the 3D mesh to extract the quad mesh representation of the avatar head.

9. The method of claim 1, further comprising:

transferring texture from the 3D mesh representation of the avatar head to the quad mesh representation of the avatar head to generate a retopologized 3D avatar head for use in animation.

10. The method of claim 1, wherein the ML model is trained on a dataset of avatar heads with manually-created topologies.

11. A system comprising:

one or more processors; and memory coupled to the one or more processors and storing instructions that, when executed by the one or more processors, cause the system to perform operations comprising:

receiving a three-dimensional (3D) mesh that is a representation of an avatar head, wherein the 3D mesh includes a plurality of mesh face elements that collectively define a mesh surface;

defining a plurality of local coordinate frames for respective ones of the mesh face elements, the local coordinate frames defined relative to geometric features of the 3D mesh including a face normal direction and tangent vectors defined on the mesh surface;

utilizing a machine learning (ML) model to:

process the 3D mesh and the defined local coordinate frames as inputs, and output a prediction of a plurality of frame fields, each of the frame fields comprising a plurality of directional vectors relative to a corresponding one of the local coordinate frames;

blending the predicted frame fields using normalized blending weights based on the face normal direction of each mesh face element and implemented as a linear combination of the directional vectors to calculate unified directional constraints for each mesh face element; and applying one or more quad meshing techniques using the unified directional constraints to extract a quad mesh representation of the avatar head.

12. The system of claim 11, wherein defining the local coordinate frames is based on a cardinal X axis, Y axis, and Z axis of a reference space.

13. The system of claim 11, wherein defining the local coordinate frames is based on alignment with a planar reference, thereby standardizing the directional vectors of the predicted frame fields across different meshes.

14. The system of claim 11, wherein the predicted frame fields include vectors for orthogonal directions relative to each local coordinate frame.

15. The system of claim 11, wherein the ML model uses directional constraints derived from the input mesh as learned output to guide the extraction of the quad mesh representation.

16. The system of claim 15, wherein the learned output corresponds to a frame field estimation procedure based on the directional constraints derived from the input mesh.

17. The system of claim 11, wherein the blending comprises triplanar mapping to address singularities in local basis vector fields.

18. The system of claim 11, wherein the extracted quad mesh representation of the avatar head is employed within an avatar creation process to create an avatar within a virtual environment.

19. A non-transitory computer-readable medium with instructions stored thereon that, when executed by a hardware processor, cause the hardware processor to perform operations comprising:

receiving a three-dimensional (3D) mesh that is a representation of an avatar head, wherein the 3D mesh includes a plurality of mesh face elements that collectively define a mesh surface;

defining a plurality of local coordinate frames for respective ones of the mesh face elements, the local coordinate frames being defined relative to geometric features of the 3D mesh including a face normal direction and tangent vectors defined on the mesh surface;

utilizing a machine learning (ML) model to:

process the 3D mesh and the defined local coordinate frames as inputs, and output a prediction of a plurality of frame fields, each of the frame fields comprising a plurality of directional vectors relative to a corresponding one of the local coordinate frames;

blending the predicted frame fields using normalized blending weights based on the face normal direction of each mesh face element and implemented as a linear combination of the directional vectors to calculate unified directional constraints for each mesh face element; and applying one or more quad meshing techniques using the unified directional constraints to extract a quad mesh representation of the avatar head.

20. The system of claim 11, wherein the normalized blending weights are selected such that contributions from directional vectors associated with local coordinate frames exhibiting reduced singularity are increased relative to contributions from directional vectors associated with local coordinate frames exhibiting greater singularity.

* * * * *